United States Patent [19]
Keeney

[11] Patent Number: 5,109,241
[45] Date of Patent: Apr. 28, 1992

[54] PHOTOGRAPHIC APPARATUS WITH AUTOMATIC FILM TYPE DETERMINATION

[75] Inventor: Richard A. Keeney, Eagan, Minn.

[73] Assignee: Management Graphics, Inc., Minneapolis, Minn.

[21] Appl. No.: 647,940

[22] Filed: Jan. 30, 1991

[51] Int. Cl.⁵ .................................................. G03B 7/24
[52] U.S. Cl. ...................................... 354/21; 235/471
[58] Field of Search ........................... 354/21; 235/471

[56] References Cited

U.S. PATENT DOCUMENTS

| | | | |
|---|---|---|---|
| 2,586,963 | 2/1952 | Knutsen | 235/471 X |
| 2,834,005 | 5/1958 | Ketchledge | 235/471 X |
| 2,881,416 | 4/1959 | Hosken | 235/471 X |
| 3,145,368 | 8/1964 | Hoover, Jr. | 235/471 X |
| 3,195,399 | 7/1965 | Jonker | 235/471 X |
| 3,206,592 | 9/1965 | Nadler | 235/471 X |
| 3,246,126 | 4/1966 | Schlieben et al. | 235/471 X |
| 3,342,978 | 9/1967 | Cameron et al. | 235/471 |
| 4,192,452 | 3/1980 | Hashimoto et al. | 235/471 |
| 4,687,307 | 8/1987 | Ohsawa | 354/21 |
| 4,782,365 | 11/1988 | Takagi | 352/78 C X |
| 4,783,672 | 11/1988 | Wirtz et al. | 354/21 |

FOREIGN PATENT DOCUMENTS 558366 of 0000 Belgium.

OTHER PUBLICATIONS

R. J. Anderson et al., "Calibration of Flying-Spot Scanner", *IBM Technical Disclosure Bulletin*, vol. 10, No. 5, Oct. 5, 1967, pp. 612-616.

Primary Examiner—Michael L. Gellner
Attorney, Agent, or Firm—Barry R. Lipsitz

[57] ABSTRACT

Photographic apparatus, such as a film recorder, uses the scanning mechanism provided for imaging photographic film to read the DX bar code on the film cassette. The DX bar code indicates the film type, film speed, and roll length. The bar code information is used to automatically set one or more parameters necessary for the proper exposure of the film.

20 Claims, 1 Drawing Sheet

PHOTOGRAPHIC APPARATUS WITH AUTOMATIC FILM TYPE DETERMINATION

BACKGROUND OF THE INVENTION

The present invention relates to photographic apparatus, and more particularly to a system for reading a bar code to determine the type of photographic film loaded into such apparatus.

Various photographic apparatus exists that accepts film loaded in cassettes. After loading a new roll of film, the user must change various settings on the photographic apparatus if the film type is different from that previously used. Failure to update the settings will result in improperly exposed images. This can result in a waste of film with a corresponding loss of valuable time. In some instances, the subject matter photographed using incorrect settings may no longer be available, resulting in a loss of the ability to obtain desired photographic images.

A film recorder is an example of photographic apparatus that uses photosensitive film. In a conventional film recorder, a light beam from a cathode ray tube ("CRT") or the like is controlled by a deflection system to scan across a stationary frame of photographic film to expose the film with an image. Typically, the images are generated by a computer for the production of slides, transparencies, photographs, or the like. Alternatively, the images can comprise natural images acquired by a scanner or television camera for subsequent processing by a computer.

Known film recorders, such as those sold under the trademark "SOLITAIRE" by Management Graphics, Inc. of Minneapolis, Minn., U.S.A., typically include a light source such as a CRT for producing a beam, a deflection system for scanning the beam across the face of the CRT, a system control and central processor unit ("CPU") for controlling the deflection system, and a camera (i.e., "film transport"). The latter component includes a film transport body, lens, lens mounting assembly, aperture plate, film plate, and film transport mechanism. An image to be recorded is first written on the phosphor of the CRT by deflecting an electron beam in a raster pattern and modulating the intensity of the beam. This process is analogous to the creation of a television picture. Alternately, the image can be written on the CRT using well known time modulation techniques, wherein the beam intensity is constant but the time the beam is kept at each point is varied depending on the exposure required.

The resulting pattern (the "object image") on the CRT is optically imaged onto photographic film by the film transport, which contains the required optics and mechanism to advance the film to successive frames. Other types of light sources can be substituted for the CRT in a film recorder. Examples include fiber optic sources, lasers, and focussed light impinging a rotating drum wherein one or more rotations are completed for each scan line.

In order for the film recorder to accommodate different film types (e.g., size in millimeters, sprocket hole type and arrangement, film processing type, such as E6, C41, etc.) and speeds (i.e., light sensitivity), specific information is needed about the particular film being exposed. This information is used to properly expose and color balance the image that the film produces when developed. Different films usually have different and distinctive color dyes and spectral sensitivity characteristics which must be correctly exposed by the light sources in the film recorder in order to result in a properly balanced picture. The methods for achieving the exposure control are highly varied and specific to the technology used in the film recorder. The film type and light sensitivity ("speed") are an important piece of information in that control.

If a film recorder permits different types of film to be used, the operator must supply information identifying which film is currently being exposed. This has usually been accomplished through a selection means such as a switch setting. Alternately, the information may be contained in a computer data file downloaded to the film recorder when a new type of film is loaded. If the settings made to the film recorder do not match the actual film loaded in the device, incorrect exposure generally results.

Various techniques are known for informing photographic apparatus about the speed of the film that is loaded. Most 35mm cameras currently on the market contain electrical contacts to identify a painted code formed by insulating paint and bare metal patches ("DX" code) on the film cassette. The DX conductive patch code identifies the speed, roll length, and exposure latitude of the film. The roll length is indicative of the number of frames (frame count) that will be available for exposure on the film. Another technique is to provide notches along an edge of the film that can be felt or sensed. Currently, some cut sheet films contain such notches that identify the film speed and type. Each of the known techniques only provide limited information about the film or require complicated and expensive notch sensors or the like.

It would be advantageous to provide apparatus for automatically determining the exact type, speed, and roll length of film loaded in a photographic device such as a film recorder. It would be further advantageous to provide such apparatus in a film recorder without the need to add a substantial amount of hardware. It would be still further advantageous to provide such apparatus that does not require any user interaction, and performs all required exposure settings automatically after determining the type and speed of film that has been loaded by the operator.

The present invention provides apparatus that enjoys the aforementioned advantages by scanning a DX bar code provided on film cassettes by most film manufacturers in addition to the DX conductive code patch, to determine the exact film type, speed, and roll length.

SUMMARY OF THE INVENTION

In accordance with the present invention, photographic apparatus is provided including a receptacle for a film cassette. A beam is scanned across a portion of a cassette mounted in the receptacle. The beam is monitored as it scans across the cassette to read indicia on the cassette. A parameter (e.g., exposure setting) of the photographic apparatus is adjusted in response to the indicia read from the cassette.

In a preferred embodiment, the indicia comprise a bar code contained on the film cassette. The bar code indicates the film type, film speed (e.g., ASA number), and frame count. The scanning beam can be generated by the same light source used for imaging film from the cassette. In a cathode ray tube film recorder, the light source comprises the CRT. Information determined from the indicia on the film cassette can be used to control a plurality of parameters, including exposure and color balance.

Monitoring of the beam can be accomplished using a photodetector mounted to view the portion of the cassette containing the indicia. The photodetector is coupled to a computer processor that interprets the indicia.

In a preferred embodiment, a new film signal is generated each time a film cassette is replaced in the photographic apparatus. The exposure parameter(s) dependent on film type and speed are updated in response to this signal.

In an embodiment where the photographic apparatus is a film recorder, a slow scan CRT used to record an image on film is also used as the source for the beam that is scanned across the film cassette. In such an embodiment, very little additional hardware is needed to implement the present invention.

DETAILED DESCRIPTION OF THE INVENTION

In order to properly expose and color balance photographic film, certain "exposure parameters" must be set in the camera or other imaging apparatus. The present invention provides apparatus for determining the type of film, film speed, and other parameters such as the length of a particular roll, from indicia (such as a bar code) contained on a film cassette.

Figure 1:
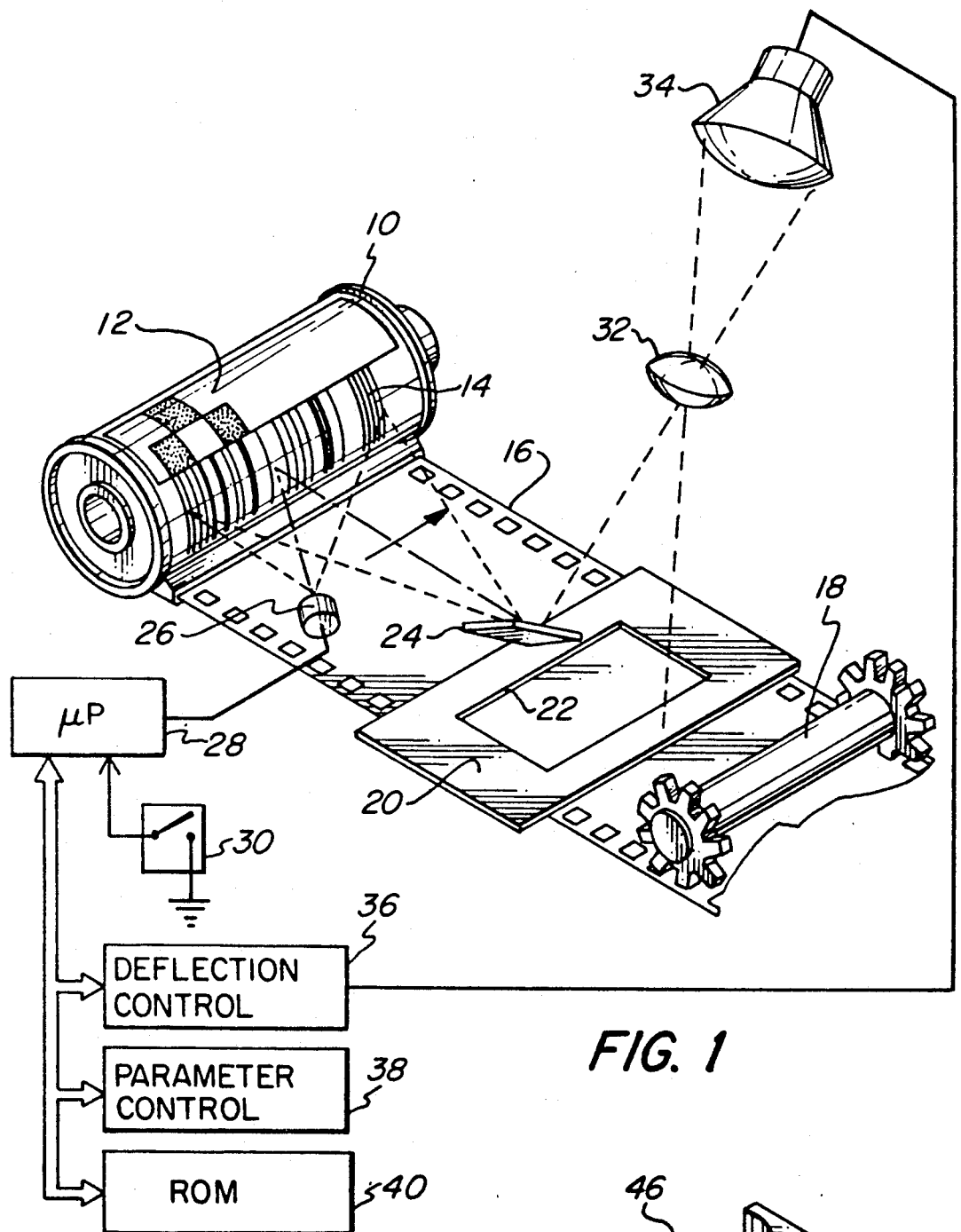
FIG. 1 is a perspective diagrammatic view of apparatus in accordance with the present invention.

Apparatus in accordance with the present invention is illustrated in diagrammatic form in FIG. 1. A standard film cassette 10 contains a roll of film 16, the length of which determines the number of frames of a given size that are available for imaging. Cassette 10 includes a DX conductive path code 12 that identifies the speed and roll length of the film in the cassette. A DX bar code 14 is also provided that identifies the film type, film speed, and roll length. Film 16 is extracted from the cassette and advanced to successive frames by a conventional sprocket wheel drive assembly 18 shown in simplified form.

In order to determine film type, speed, and roll length information for use by a photographic device, apparatus in accordance with the present invention reads bar code 14. In a film recorder embodiment as shown in FIG. 1, an imaging CRT 34 is used to image a frame 22 of film 16 by scanning a beam across the frame on a line-by-line basis. A lens 32 is provided to facilitate proper focusing of the image at the film plane. An aperture 20 is used to limit the exposure of the film to the frame area 22.

In accordance with the present invention, a mirror 24 is provided outside of the frame area 22 but within the scan range of CRT 34. A "flying spot" from the CRT is deflected along mirror 24, which reflects the light across bar code 14. Diffuse light reflected from the bar code portion of the cassette is sensed by a photoelectric sensor 26, the output of which is input to a microprocessor 28. Each time a new film cassette is installed into the image recorder, a switch 30 generates a new film signal for actuating microprocessor 28 to deflect the CRT beam via deflection control 36 to mirror 24. This enables scanning of the bar code, determination of the film type, speed, and roll length from information contained in the bar code, and adjusting of the film recorder exposure and frame count parameters in accordance with the particular film installed. Adjustment of the film recorder parameters is accomplished by a parameter control circuit 38 that receives commands from microprocessor 28 and responds by adjusting the necessary exposure settings, color balance settings, and frame count setting of the film recorder. ROM 40 contains a look-up table that references bar code patterns to film types (including roll length) and the associated exposure parameters necessary to properly expose the film. The information contained in the look-up table could alternatively be provided by a "host" computer.

Switch 30 can provide either manual or automatic operation. In a manual embodiment, the operator must physically actuate the switch after loading a new cassette into the apparatus. In an automatic embodiment, the switch can comprise a microswitch or the like that is actuated by the film cassette itself or by the opening and subsequent closing of an access cover. In yet another embodiment, the new film signal is a command from a host computer that the recorder is connected to.

Figure 2:
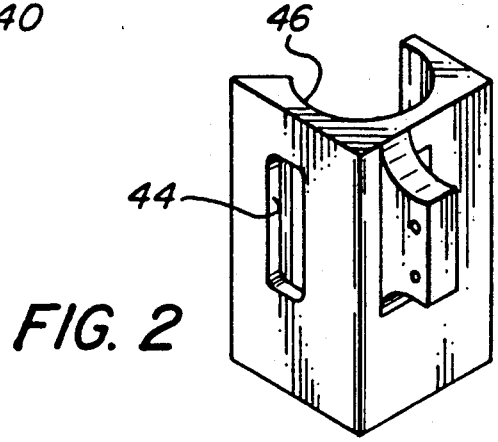
FIG. 2 is a partial perspective view of a film cassette receptacle for use in apparatus of the present invention.

FIG. 2 illustrates a portion of a receptacle for film cassette 10. The receptacle 46 is part of a film transport mechanism used in the film recorder or other photographic apparatus. In accordance with the present invention, a window 44 is provided in receptacle 46 so that bar code 14 can be viewed by photosensor 26 when the film cassette is mounted in the receptacle. Those skilled in the art will appreciate that various other types of receptacles can be used to hold film cassette 10, and the embodiment of FIG. 2 is for illustrative purposes only. In order to achieve the objective of the present invention, it is necessary that any such receptacle include a window or other means for enabling the bar code 14 to be read when the film cassette is installed in the transport.

It should now be appreciated that the present invention provides apparatus for automatically determining the film type, film speed, and roll length of a DX or similarly bar coded film cassette loaded into photographic apparatus for use in adjusting one or more parameters necessary in the operation thereof. In the film recorder embodiment illustrated, the scanning mechanism provided to image the film is also used to scan a DX bar code on the film cassette. It is noted that the scanning mechanism can read other indicia on the film cassette in addition to or instead of the DX bar code 14, such as, for example, the DX conductive patch code 12. The additional hardware required to implement the invention is minimal.

Although the invention has been described in connection with a specific embodiment thereof, those skilled in the art will appreciate that numerous adaptations and modifications may be made thereto without departing from the spirit and scope of the invention, as set forth in the following claims.

What is claimed is:

1. In a film recorder comprising a scanning spot image generator, a film plane positioned to receive an image from said generator, and a film transport for extracting photographic film from a film cassette and positioning said film in the film plane, the improvement comprising:
   means for scanning a spot from said image generator across indicia on said film cassette;
   means for reading the indicia scanned by said spot; and means responsive to said reading means for adjusting a parameter of said film recorder.

2. A film recorder in accordance with claim 1 wherein said indicia comprise a coded pattern such as a bar code.

3. A film recorder in accordance with claim 1 wherein said parameter is a film exposure parameter.

4. A film recorder in accordance with claim 1 wherein said parameter is a roll length parameter.

5. A film recorder in accordance with claim 1 wherein said adjusting means controls a plurality of film recorder parameters in response to information obtained from said indicia.

6. A film recorder in accordance with claim 5 wherein said indicia comprise a coded pattern such as a bar code.

7. A film recorder in accordance with claim 1 wherein said image generator comprises a cathode ray tube for providing said spot.

8. A film recorder in accordance with claim 1 wherein said reading means comprise a photodetector mounted to receive light from said spot reflected off of said cassette.

9. A film recorder in accordance with claim 1 further comprising:
means for generating a new film signal indicative of the mounting of a new film cassette in said transport; and
means responsive to said reset signal for actuating said scanning, reading and adjusting means to update said parameter based on indicia contained on the new film cassette.

10. Photographic imaging apparatus comprising:
a receptacle for a film cassette;
means for scanning a beam across a portion of a cassette mounted in said receptacle;
means for monitoring said beam as it scans across said portion to read indicia on said cassette; and
means responsive to the indicia read by said monitoring means for adjusting an operating parameter of said photographic apparatus.

11. Apparatus in accordance with claim 10 wherein said indicia comprise a coded pattern such as a bar code.

12. Apparatus in accordance with claim 10 wherein said scanning means comprise a light source used for imaging film from the cassette.

13. Apparatus in accordance with claim 12 wherein said light source comprises a cathode ray tube.

14. Apparatus in accordance with claim 12 wherein said adjusting means controls a plurality of operating parameters in response to said indicia.

15. Apparatus in accordance with claim 12 wherein said monitoring means comprise a photodetector mounted to view said cassette portion.

16. Apparatus in accordance with claim 15 wherein said monitoring means further comprise:
a computer processor coupled to said photodetector, for interpreting said indicia.

17. Apparatus in accordance with claim 16 wherein said indicia comprise a coded pattern such as a bar code.

18. Apparatus in accordance with claim 10 further comprising:
means for generating a new film signal indicative of the replacement of a film cassette;
means responsive to said new film signal for actuating said scanning, monitoring and adjusting means to update said exposure parameter.

19. Apparatus in accordance with claim 10 further comprising:
a flying spot scanner for providing said beam; and
means for scanning the beam from said scanner across a portion of film extracted from said cassette to record an image.

20. Apparatus in accordance with claim 19 further comprising:
means for generating a new film signal indicative of the replacement of a film cassette; and
means responsive to said new film signal for actuating said scanning, monitoring and adjusting means to update said exposure parameter.

* * * * *